United States Patent [19]

Ueno et al.

[11] 4,297,463

[45] Oct. 27, 1981

[54] METHOD FOR POLYMERIZING α-OLEFIN

[75] Inventors: Haruo Ueno, Chiba; Takefumi Yano, Ichihara; Tokuji Inoue, Ichihara; Shigeru Ikai, Ichihara; Yoshiyuki Kai, Ichihara; Michimasa Shimizu, Ichihara, all of Japan

[73] Assignee: Ube Industries, Ltd., Chiba, Japan

[21] Appl. No.: 147,279

[22] Filed: May 6, 1980

[30] Foreign Application Priority Data

Sep. 21, 1979 [JP] Japan ............................ 54-120726

[51] Int. Cl.$^3$ ........................... C08F 4/02; C08F 10/06
[52] U.S. Cl. ................................. 526/128; 252/429 B; 526/124; 526/125; 526/127; 526/151; 526/351
[58] Field of Search ................ 526/125, 128, 151, 127

[56] References Cited

U.S. PATENT DOCUMENTS 4,220,554 9/1980 Scata et al. ...................... 526/125
4,242,479 12/1980 Yokata et al. ...................... 526/128

Primary Examiner—Edward J. Smith
Attorney, Agent, or Firm—Burgess, Ryan and Wayne

[57] ABSTRACT

Poly-α-olefin having an excellent H. I. is produced with an excellent yield by bringing, in the presence of an organic acid ester, a feed, containing at least one α-olefin having 3 or more carbon atoms, into contact with a catalyst which comprises (A) a solid catalytic ingredient prepared (a) by reacting a Grignard compound with an aluminium halide-tetraalkoxysilane reaction product, (b) bringing the resultant reaction product into a first contact with titanium tetrahalide, (c) treating the resultant titanium-containing solid product with an organic acid ester, and, finally, (d) bringing the treated solid product into a second contact with titanium tetrahalide, and; (B) another catalytic ingredient consisting of a trialkyl aluminium.

25 Claims, No Drawings

METHOD FOR POLYMERIZING α-OLEFIN

FIELD OF THE INVENTION

The present invention relates to a method for polymerizing an α-olefin. More particularly, the present invention relates to a method for polymerizing a feed containing at least one α-olefin having 3 or more carbon atoms.

BACKGROUND OF THE INVENTION

It is known that an α-olefin having 3 or more carbon atoms can be polymerized by using a catalyst composed of a solid catalytic ingredient in which a titanium tetrahalide is carried on a magnesium compound and another component which consists of an organic aluminium compound. With respect to the above-mentioned polymerization, various approaches have been attempted to provide a new method which is effective for increasing the yield of the resultant polymer per unit weight of the solid catalytic ingredient in the catalyst used, to such an extent that the resultant polymer contains a very small content of the used catalyst therein and, therefore, an operation for removing the used catalyst from the resultant polymer can be omitted.

However, the attempted approaches were unsatisfactory due to the following drawbacks.

1. The method failed to increase the yield of the polymer per unit weight of the solid catalytic component to such an extent that the removing operation for the used catalyst could be omitted.

2. The durability in the catalytic activity of the catalyst for the polymerization of the α-olefin is poor.

3. The sensitivity of the catalyst to hydrogen, which is used as a molecular weight-regulating agent for the polymer, is poor. Therefore, a large amount of hydrogen is necessary for regulating the molecular weight of the polymer.

Also, it is known from, for example, Japanese Patent Application Laying-open No. 53-78287 (1978), that ethylene can be polymerized by using a catalyst composed of a solid catalytic component which has been prepared by reacting a magnesium alcoholate with a reaction product of an aluminium halide with a tetraalkoxysilane, and by bringing the resultant solid product into contact with titanium tetrahalide, and another catalytic component consisting of an organic aluminium compound. However, when the above-mentioned type of catalyst is applied to the polymerization of the α-olefin having 3 or more carbon atoms, the resultant polymer exhibits a remarkably poor degree of stereoregularity. Also, even if the above-mentioned solid catalytic component is treated with an organic acid ester and, then, the treated solid component is brought into contact with titanium tetrahalide, the resultant catalyst, which is composed of the above-prepared solid catalytic component and the other catalytic component consisting of an organic aluminium compound, causes the resultant polymer from the α-olefin having 3 or more carbon atoms to exhibit a poor stereoregularity and a low yield.

SUMMARY OF THE INVENTION

An object of the present invention is to provide a method for polymerizing an α-olefin having 3 or more carbon atoms to produce a poly-α-olefin having an excellent stereoregularity.

Another object of the present invention is to provide a method for polymerizing an α-olefin having 3 or more carbon atoms by using such a very small amount of catalyst that it is not necessary to remove the used catalyst from the resultant polymer.

Still another object of the present invention is to provide a method for polymerizing an α-olefin having 3 or more carbon atoms by using a catalyst which exhibits an excellent durability in catalytic activity.

A further object of the present invention is to provide a method for polymerizing an α-olefin having 3 or more carbon atoms by using a catalyst which exhibits an excellent sensitivity to hydrogen as a molecular weight-regulating agent for the resultant polymer.

The above-mentioned objects can be attained by the method of the present invention which comprises bringing, in the presence of an organic acid ester, a feed containing at least one α-olefin, having 3 or more carbon atoms, into contact with a catalyst comprising (A) a solid catalytic ingredient which has been prepared in such a manner that (a) a Grignard compound is reacted with a reaction product of an aluminium halide with a tetraalkoxysilane, (b) the resultant solid reaction product is brought into a first contact with a titanium tetrahalide, (c) the resultant titanium-containing solid product is treated with an organic acid ester and, finally, (d) the resultant treated solid product is brought into a second contact with a titanium tetrahalide, and (B) another catalytic ingredient consisting of at least one trialkylaluminium.

DETAILED DESCRIPTION OF THE INVENTION

In the method of the present invention, it is essential that the polymerization of at least one α-olefin having 3 or more carbon atoms and contained in a feed is carried out in the presence of an organic acid ester and in the presence of a specific catalyst.

In the specific catalyst, a solid catalytic ingredient is prepared in an atmosphere consisting of an inert gas, for example, nitrogen and argon gases, from a reaction product of an aluminium halide with a tetraalkoxysilane, a Grignard compound, a titanium tetrahalide and an organic acid ester, all of which contain substantially no water therein.

The aluminium halide is usually selected from the group consisting of aluminium chloride, aluminium bromide and aluminium iodide. The most useful aluminium halide is aluminium chloride.

The tetraalkoxysilane is usually selected from those of the formula, $Si(OR^1)_4$ wherein $R^1$ represents an alkyl radical having 1 to 8 carbon atoms. The tetraalkoxysilane is preferably selected from the group consisting of tetramethoxysilane, tetraethoxysilane, tetrapropoxysilane, tetrabutoxysilane and tetrapentoxysilane.

In the preparation of the reaction product of the aluminium halide and the tetraalkoxysilane, it is preferable that the aluminium halide is used in an amount of from 0.25 to 10 moles, more preferably, one mole, per mole of the tetraalkoxysilane. The reaction of the aluminium chloride with the tetraalkoxysilane is usually carried out by stirring a solution of both the aluminium chloride and the tetraalkoxysilane in an organic inert organic solvent, at a temperature of from −50° C. to 100° C. for 0.1 to two hours. The inert organic solvent comprises at least one compound selected from the group consisting of aliphatic and aromatic hydrocarbons, for instance, hexane, heptane, benzene and toluene, and halogenated aliphatic and aromatic hydrocarbons, for example, chlorobenzenes, dichlorohexane and dichloroheptane. This reaction is an exothermic reaction. The resultant reaction product is obtained in the form of a solution in the inert organic solvent. Usually, the reaction product is not isolated from the solution and the solution is used for the reaction with the Grignard compound.

The Grignard compound is preferably selected from those of the formula, $R^2MgX$ in which $R^2$ represents an alkyl radical having 1 to 8 carbon atoms and X represents a halogen atom. In the above-mentioned formula, it is preferable that X represents a chlorine atom. That is, the Grignard compound is preferably selected from methylmagnesium chloride, ethylmagnesium chloride, butylmagnesium chloride and hexylmagnesium chloride.

Also, it is preferable that the Grignard compound is used in an amount of from 0.05 to 4 moles, more preferably, about 2 moles, per mole of the tetraalkoxysilane which has been reacted with the aluminium halide.

The reaction of the Grignard compound with the aluminium halide-tetraalkoxysilane reaction product in Step (a) can be carried out in any of the conventional reaction methods. For example, it is preferable that a solution of the Grignard compound in an ether, or a mixture of the ether and an aromatic hydrocarbon, is gradually added to a solution of the aluminium halide-tetraalkoxysilane reaction product in the inert organic solvent. Also, it is preferable that the solution of the aluminium halide-tetraalkoxysilane reaction product is gradually added to the solution of the Grignard compound. The above-mentioned ether is preferably selected from those of the formula $R^3$-O-$R^4$, wherein $R^3$ and $R^4$ represent an alkyl radical having 2 to 8 carbon atoms, respectively. The preferable ethers are diethyl ether, di-isopropyl ether, di-n-butyl ether, and di-isoamyl ether.

The reaction of the Grignard compound with the aluminium halide-tetraalkoxysilane reaction product in Step (a) is usually carried out at a temperature of from $-50°$ to $100°$ C., preferably, from $-20°$ to $25°$ C., for a period of time sufficient for completing the reaction, usually, about 5 minutes or more. The reaction in Step (a) results in precipitation of a solid white reaction product from the reaction mixture.

The resultant solid reaction product in Step (a) is separated from the reaction mixture. The separated solid reaction product can be directly subjected to Step (b). However, it is preferable that the separated solid reaction product is washed with an organic solvent, for example, benzene, toluene, hexane and heptane.

In Step (b), the solid reaction product is first brought into contact with a titanium tetrahalide, so as to allow at least a portion of the titanium used to be incorporated to the solid reaction product. The titanium tetrahalide to be used in Step (b) is preferably selected from titanium tetrachloride, titanium tetrabromide and titanium tetraiodides. The most preferable titanium tetrahalide is titanium tetrachloride. Also, in Step (b), it is preferable that the titanium tetrahalide is used in an amount of one mole or more, more preferably, from 2 to 100 moles, per mole of the Grignard compound used in Step (a). In Step (b), the first contact of the solid reactant product with the titanium tetrahalide is carried out in the presence or absence of an inert organic solvent, for example, benzene, toluene, hexane and heptane, at a temperature of from $20°$ to $200°$ C., preferably, from $60°$ to $140°$ C., for a period of time sufficient for completing the first contact, usually, from 0.5 to three hours.

After the first contact is completed, the resultant titanium-containing solid product is separated from the contacting mixture by means of filtration or decantation. The separated product is washed with an inert organic solvent and then subjected to the treatment in Step (c). The separated product contains 0.1 to 10% by weight of titanium.

The organic acid ester to be used in Step (c) can be selected from aliphatic carboxylic acid esters, aromatic carboxylic acid esters and cycloaliphatic carboxylic acid esters. However, it is preferable that the organic acid ester is selected from the aromatic carboxylic acid esters of the formula:

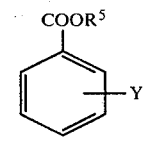

wherein $R^5$ represents an alkyl radical having 1 to 6 carbon atoms and Y represents a hydrogen atom, an alkyl radical having 1 to 4 carbon atoms or a radical of the formula-$OR^6$ in which $R^6$ represents an alkyl radical having 1 to 4 carbon atoms. The preferable organic acid esters for Step (c) are methyl benzoate, ethyl benzoate, methyl toluate, ethyl toluate, methyl anisate and ethyl anisate. Also, it is preferable that the organic acid ester is used in an amount of from 0.1 to 10 millimoles per gram of the titanium-containing solid product to be used in Step (c).

The treatment of Step (c) can be effected by the any of the conventional treating methods for a titanium-containing solid material with an organic acid ester. However, in a preferable method, the titanium-containing solid product is suspended in an inert organic solvent, and the organic acid ester is added to the suspension while stirring the mixture, at a temperature of from $0°$ to $200°$ C., preferably, from $5°$ to $150°$ C. for a period of time sufficient for completing the treatment, usually, 5 minutes or more.

The resultant treated solid product in Step (c) is separated from the treating mixture by means of filtration or decantation, and, then, washed with an inert organic solvent.

The separated solid product is subjected to a second contact with a titanium tetrahalide in Step (d).

The second contact operation can be effected in the same manner as that in Step (b) so as to allow at least a portion of titanium to be incorporated in the solid product. When the second contact operation is completed, the resultant solid catalytic ingredient is separated from the second contacting mixture by means of filtration or decantation and, finally, washed with an inert organic solvent. The separated solid catalytic ingredient contains 0.5 to 5% by wieght of titanium.

The resultant solid catalytic ingredient is used concurrently with another catalytic ingredient consisting of at least one trialkylaluminium. The trialkylaluminium is preferably selected from those of the formula Al-$R_3^7$ in which $R^7$ represents an alkyl radical having 2 to 6 carbon atoms. The preferable trialkylaluminiums for the present invention are triethylaluminium, tri-isobutyl-aluminium and tri-n-hexylaluminium. The most useful trialkylaluminiums are triethylaluminium and tri-isobutyl-aluminium.

The trialkylaluminium is usually used in an amount of from 1 to 1,000 moles per gram atom of titanium contained in the solid catalytic ingredient.

In the method of the present invention, the feed to be brought into contact with the catalyst contains at least one α-olefin having 3 or more carbon atoms. The α-olefin may be selected from the group consisting of propylene, 1-butene, 4-methyl-1-pentene and 1-hexene. The feed may consists of only one α-olefin having 3 carbon atoms or a mixture of two or more different α-olefins each having 3 or more carbon atoms. In the former case, a homopolymer of the α-olefine is obtained, and in the later case, a copolymer of the two or more different α-olefines is produced. Also, the feed may consist of a mixture of at least one α-olefin having 3 or more carbon atoms with ethylene. In this case, ethylene is copolymerized with the α-olefin.

The feed is brought into contact with the catalyst in the presence of an organic acid ester. This organic acid ester can be selected from the same group as that for the organic acid esters to be used in Step (b). In the polymerization mixture, the organic acid ester is presented in an amount of from 0.05 to 0.6 moles per mole of the trialkylaluminium in the catalyst.

The polymerization mixture may contain a polymerization medium, that is, an inert organic solvent consisting of at least one member selected from benzene, toluene, hexane and heptane. Also, the polymerization mixture may not contain the polymerization medium.

The catalyst is suspended in any concentration in the polymerization mixture. Usually, the concentration of the catalyst is in a range of from 0.001 to 10 millimoles, in terms of element titanium contained in the catalyst, per liter of the polymerization mixture, and in a range of from 0.01 to 1,000 millimoles, in terms of trialkylaluminium contained in the catalyst, per liter of the polymerization mixture.

In the method of the present invention, the polymerization operation can be carried out in the same manner as that for the polymerization operation of the α-olefin using a Ziegler-Natta type catalyst. That is, the polymerization mixture inhibits the absorption of water. The polymerization temperature is usually in a range of from 30° to 100° C. and the polymerization pressure is usually in a range of from 1 to 80 kg/cm$^2$.

The method of the present invention can produce a poly-α-olefin with a remarkably high degree of yield per a unit weight of the solid catalytic ingredient contained in the catalyst used. Therefore, it is not necessary to remove the residual catalyst from the resultant polymer.

Also, in the method of the present invention, the catalyst exhibits an excellent durability in the catalytic activity thereof. Therefore, polymerization can be effected stably.

Furthermore, the catalyst exhibits an excellent sensitivity to hydrogen which is used as a molecular weight regulating agent for the resultant polymer. Therefore, when the catalyst of the present invention is used, it is easy to regulate the molecular weight of the resultant polymer by using a small amount of hydrogen.

The specific examples presented hereinafter will serve to more fully explain how the present invention is practiced. However, it will be understood that these examples are only illustrative and in no way limit the scope of the present invention.

In the examples, the term "polymerization activity" used refers to a yield in grams of a resultant polymer per gram of a solid catalytic ingredient contained in a catalyst, per hour of polymerization time.

Also, the term "H.I." refers to a ratio in percent of the weight of a residue remaining after a polymer is extracted with boiling n-heptane for twenty hours, to the entire weight of the polymer.

Furthermore, the term "M.I." used in the examples refers to a melt flow index of a polymer which has been measured at a temperature of 230° C. under a load of 2.16 kg/cm$^2$ in accordance with ASTM D1238.

The preparation of a solid catalytic ingredient in each example, was carried out in a dry nitrogen atmosphere.

EXAMPLE 1

1. Preparation of Solid Catalytic Ingredient

A reaction product of aluminium chloride with tetraethoxysilane was prepared in such a manner that 15 millimoles of anhydrous aluminium chloride were dissolved in 40 ml of toluene, 15 millimoles of tetraethoxysilane were added to the aluminium chloride solution and, then, the mixture was stirred at a temperature of 25° C. for one hour.

The resultant reaction mixture was cooled to a temperature of −10° C., and a solution of 30 millimoles of n-butylmagnesium chloride in 25 ml of di-isoamyl ether was added dropwise to the cooled reaction mixture over 60 minutes while stirring the mixture. During this addition procedure, the temperature of the mixture was maintained in a range of from −10° to 0° C. After the dropwise addition was completed, for one hour so as to continue the reaction. A solid product was precipitated from the reaction mixture. The solid product was filtered and washed with toluene and, then, with n-heptane.

The result of an elementary analysis of the resultant solid product is as follows.

Mg: 14.5% by weight, Al: 1.5% by weight, Si: 4.7% by weight, Cl: 43.8% by weight, —OC$_2$H$_5$: 20.1% by weight The resultant reaction product was suspended in 2.5 ml of toluene, and 150 millimoles of titanium tetrachloride were added to the suspension. The mixture was stirred at a temperature of 90° C. for one hour so as to allow the solid product to come into contact with titanium tetrachloride. The resultant titanium-containing solid product was filtered at 90° C., and washed with toluene and, then, with n-heptane.

2.8 g of the titanium-containing solid product were suspended in 25 ml of toluene, 6.0 millimoles of ethyl benzoate were added to the suspension, and the mixture was stirred at a temperature of 90° C. for one hour. The treated solid product was filtered at 90° C. and washed with toluene and, then, with n-heptane.

The resultant treated solid product was suspended in 25 ml of toluene, 150 millimoles of titanium tetrachloride were added to the suspension, and, then, the mixture was stirred at a temperature of 90° C. for one hour so as to bring the treated solid product into contact with titanium tetrachloride. The resultant solid catalytic ingredient was separated from the mixture at 90° C. by means of filtration, and washed with toluene and, then, with n-heptane.

The resultant solid catalytic ingredient in an amount of 2.9 g was suspended in 50 ml of n-heptane. The solid catalytic ingredient contained 2.5% by weight of titanium.

2. Polymerization

The suspension containing 11.6 mg of the solid catalytic ingredient was placed in a glass ampoule and the ampoule was sealed. The ampoule was placed in a 1-liter autoclave with a stirrer, and, thereafter, the autoclave was closed and air in the autoclave was replaced by nitrogen gas.

The autoclave was charged with 6.6 ml of a solution of 0.15 millimoles of p-methyl toluate in n-heptane and, then, with 1.7 ml of another solution of 0.61 millimole of triethyl aluminium in n-heptane.

Next, 600 ml of liquid propylene were introduced into the autoclave, and the autoclave was shaken.

When the temperature of the content in the autoclave reached 65° C., a stirring operation was applied to the content in the autoclave so as to break the glass ampoule, and to start the polymerization of propylene. The polymerization operation was continued at a temperature of 65° C. for one hour.

After the polymerization was completed, non-reacted propylene was exhausted from the autoclave, the broken glass ampoule was removed from the polymerization mixture. The resultant polypropylene was dried at a temperature of 50° C. under a vacuum condition for 20 hours.

159 g of white polypropylene powder were obtained. The polypropylene exhibited a bulk density of 0.36 and an H. I. of 95.6%. The polymerization activity was 16,800.

EXAMPLES 2 AND 3

In each of Examples 2 and 3, the same procedures as those mentioned in Example 1 were carried out, except that in the polymerization, p-methyl toluate was used in an amount of 0.12 millimoles in Example 2 and 0.10 millimoles in Example 3.

The results of Examples 2 and 3 are indicated in Table 1 in comparison with those of Example 1.

TABLE 1

| Example No. | Amount of p-methyl toluate (millimole) | Polymerization activity | H. I. (%) |
|---|---|---|---|
| 1 | 0.15 | 16,800 | 95.6 |
| 2 | 0.12 | 20,200 | 93.5 |
| 3 | 0.10 | 23,000 | 91.5 |

EXAMPLES 4 TO 6

In each of Examples 4 to 6, the same procedures as those described in Example 1 were carried out, except that in the polymerization, triethyl aluminium was used in an amount of 0.30 millimoles and, p-methyl toluate was used in an amount as indicated in Table 2.

The results of Examples 4 to 6 are indicated in Table 2.

TABLE 2

| Example No. | Amount of p-methyl toluate (millimole) | Polymerization activity | H. I. (%) |
|---|---|---|---|
| 4 | 0.08 | 12,000 | 96.3 |
| 5 | 0.07 | 17,900 | 92.3 |
| 6 | 0.06 | 18,200 | 87.7 |

EXAMPLE 7

Procedures identical to those described in Example 1 were carried out, except that the polymerization procedure was carried out for two hours. The polypropylene was obtained in a yield of 247 g and exhibited an H. I. of 96.0%.

EXAMPLES 8 AND 9

The same procedures as those described in Example 1 were carried out, except that before the liquid propylene was introduced, hydrogen gas was introduced into the autoclave so that the pressure on the gauge in the autoclave reached the value as indicated in Table 3.

The results of Examples 8 and 9 are indicated in Table 3.

EXAMPLE 10

The same procedures as those described in Example 8 were carried out, except that in the polymerization, p-methyl toluate was used in an amount of 0.17 millimoles.

The results are indicated in Table 3.

TABLE 3

| Example No. | Amount of p-methyl toluate (millimole) | Pressure of hydrogen (kg/cm$^2$) | Polymerization activity | H. I. (%) | M. I. (g/10 minutes) |
|---|---|---|---|---|---|
| 8 | 0.15 | 0.5 | 20,400 | 91.3 | 6.2 |
| 9 | 0.15 | 1.0 | 18,200 | 90.5 | 10.2 |
| 10 | 0.17 | 0.5 | 14,400 | 94.5 | 4.2 |

Comparative Example 1

1. Preparation of Solid Catalytic Ingredient

A comparative solid catalytic Ingredient was prepared by the same procedures as those described in Example 1, except that 30 millimoles of magnesium ethoxide were used in place of n-butyl magnesium chloride.

The resultant comparative solid catalytic ingredient contained 2.75% by weight of titanium.

2. Polymerization

Polypropylene was prepared in the same manner as that described in Example 1, except that 11.6 mg of the comparative solid catalytic ingredient were used.

The resultant polymer exhibited a poor H. I. of 80.1%. The polymerization activity was 2,500.

EXAMPLE 11

1. Preparation of Solid Catalytic Ingredient

A solid catalytic ingredient was prepared in the same manner as that described in Example 1, except 15 millimoles of tetra-n-butoxysilane were used in place of tetraethoxysilane, and ethyl benzoate was used in an amount of 4.5 millimoles. The resultant solid catalytic ingredient contained 2.6% by weight of titanium.

2. Polymerization

The same polymerization procedures as those described in Example 1 were carried out, except that the above-mentioned solid catalytic ingredient was used in an amount of 11.6 mg, triethyl aluminium was used in an amount of 1.20 millimoles, and p-methyl toluate was used in an amount of 0.30 millimoles.

The resultant polypropylene exhibited an H. I. of 95.0%. The polymerization activity was 17,000.

EXAMPLE 12

1. Preparation of Solid Catalytic Ingredient

A solid catalytic ingredient was prepared in the same manner as those described in Example 11, except that 15 millimoles of tetra-isopentoxysilane were used in place of tetra-n-butoxysilane. The resultant solid catalytic ingredient contained 2.5% by weight of titanium.

2. Polymerization

Polypropylene was produced by using 11.6 mg of the above-prepared solid catalytic ingredient in the same manner as that described in Example 11. The polypropylene exhibited an H. I. of 95.0%. The polymerization activity was 17,700.

EXAMPLE 13

1. Preparation of Solid Catalytic Ingredient

A solid catalytic Ingredient was prepared in the same manner as that described in Example 1, except that the n-butyl magnesium chloride was replaced by 30 millimoles of ethyl magnesium chloride. The resultant solid catalytic ingredient contained 2.5% by weight of titanium.

2. Polymerization

The same polymerization procedures as those described in Example 1 were carried out by using 11.6 mg of the above-prepared solid catalytic ingredient.

The resultant polypropylene exhibited an H. I. of 95.1%. The polymerization activity was 16,300.

EXAMPLE 14

The same procedures as those described in Example 1 were carried out, except that 0.61 millimoles of tri-isobutyl aluminium were used instead of triethyl aluminium.

The resultant polypropylene exhibited an H. I. of 94.8%. The polymerization activity was 17,200.

EXAMPLE 15

The same procedures as those described in Example 1 were carried out, except that 0.15 millimoles of ethyl benzoate were used in place of p-methyl toluate. The resultant polypropylene exhibited an H. I. of 90.5%. The polymerization activity of 15,300.

EXAMPLE 16

1. Preparation of Solid Catalytic Ingredient

A solid catalytic ingredient was prepared in the same manner as that described in Example 1, except that ethyl benzoate was used in an amount of 4.5 millimoles. The resultant solid catalytic ingredient contained 2.5% by weight of titanium.

2. Polymerization

The same polymerization procedures as those described in Example 1 were carried out by using 11.6 mg of the above-prepared solid catalytic ingredient.

The resultant polypropylene exhibited an H. I. of 95.8%. The polymerization activity was 16,600.

We claim:

1. A method for polymerizing an α-olefin which comprises bringing, in the presence of an organic acid ester, a feed containing at least one α-olefin having 3 or more carbon atoms into contact with a catalyst comprising (A) a solid catalytic ingredient prepared by (a) reacting an aluminium halide with a tetraalkoxysilane to form a first reaction product, (b) reacting a Grignard compound with said first reaction product to form a second solid reaction product, (c) contacting said second solid reaction product with a titanium tetrahalide, (d) treating the resultant titanium-containing solid product with an organic acid ester and, finally, (e) contacting the treated solid product with a titanium tetrahalide; and (B) another catalytic ingredient consisting of at least one trialkyl aluminium.

2. A method as claimed in claim 1, wherein said α-olefin is selected from the group consisting of propylene, 1-butene, 4-methyl-1-pentene and 1-hexene.

3. A method as claimed in claim 1, wherein the contact of said feed with said catalyst is carried out at a temperature of from 30° to 100° C.

4. A method as claimed in claim 1, wherein the contact of said feed with said catalyst is effected under a pressure of from 1 to 80 kg/cm$^2$.

5. A method as claimed in claim 1, wherein said aluminium halide is selected from the group consisting of aluminium chloride, aluminium bromide and aluminium iodide.

6. A method as claimed in claim 1, wherein said tetraalkoxysilane is selected from those of the formula, Si(OR$^1$), wherein R$^1$ represents an alkyl radical having 1 to 8 carbon atoms.

7. A method as claimed in claim 1, wherein said aluminium halide is used in an amount of from 0.25 to 10 moles per mole of said tetraalkoxysilane.

8. A method as claimed in claim 1, wherein said Grignard compound to be used in Step (A) is selected from those of the formula, R$^2$MgX, wherein R$^2$ represents an alkyl radical having 1 to 8 carbon atoms and X represents a halogen atom.

9. A method as claimed in claim 1, wherein in Step (b) said Grignard compound is used in an amount of from 0.05 to 4 moles per mole of said tetraalkoxysilane.

10. A method as claimed in claim 1, wherein said reaction of in Step (b) is carried out at a temperature of from −50° to 100° C.

11. A method as claimed in claim 1, wherein the solid reaction product in Step (b) is washed with an organic solvent consisting of at least one member selected from the group consisting of benzene, toluene, hexane and heptane.

12. A method as claimed in claim 1, wherein said titanium tetrahalide to be used in Step (c) is selected from titanium tetrachloride, titanium tetrabromide, and titanium tetraiodide.

13. A method as claimed in claim 1, wherein in Step (c), said titanium tetrahalide is used in an amount of at least one mole per mole of said Grignard compound used in Step (b).

14. A method as claimed in claim 1, wherein the first contact of said second solid reaction product with said titanium tetrahalide in Step (c) is carried out at a temperature of from 20° to 200° C.

15. A method as claimed in claim 1, wherein the titanium-containing solid product prepared in Step (c) contains 0.5 to 10% by weight of titanium.

16. A method as claimed in claim 1, wherein said organic acid ester to be used in Step (d) is selected from aromatic carboxylic acid esters of the formula:

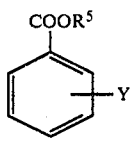

where $R^5$ represents an alkyl radical having 1 to 6 carbon atoms and Y represents a hydrogen atom, an alkyl radical having 1 to 4 carbon atoms or a radical of the formula, $OR^6$, in which $R^6$ represents an alkyl radical having 1 to 4 carbon atoms.

17. A method as claimed in claim 1, wherein said treatment in Step (d) is carried out at a temperature of from 0° to 200° C.

18. A method as claimed in claim 1, wherein said solid catalytic ingredient contains 0.5 to 5% by weight of titanium.

19. A method as claimed in claim 1, wherein said trialkyl aluminium is selected from those of the formula, $Al R_3^7$, wherein $R^7$ represents an alkyl radical having 2 to 6 carbon atoms.

20. A method as claimed in claim 1, wherein said trialkyl aluminium is used in an amount of from 1 to 1000 moles per gram atom of titanium contained in said solid catalytic ingredient.

21. A method as claimed in claim 1, wherein said organic acid ester presented in said polymerization mixture is used in an amount of from 0.05 to 0.6 moles per mole of trialkylaluminium contained in said catalyst.

22. A method as claimed in claim 1, wherein said catalyst is suspended in the polymerization mixture.

23. A method as claimed in claim 22, wherein said catalyst suspended in said polymerization mixture is in an amount, in terms of elemental titanium, of 0.001 to 10 milligram atoms per liter of said polymerization mixture.

24. A method as claimed in claim 22, wherein said catalyst suspended in said polymerization mixture is in an amount, in terms of the trialkyl aluminium, of 0.01 to 1,000 millimoles per liter of said polymerization mixture.

25. A method as claimed in claim 1, wherein in step (d), said organic acid ester is used in an amount of from 0.1 to 10 millimoles per gram of said titanium-containing solid product.

* * * * *